United States Patent [19]

Schmidt

[11] Patent Number: 4,748,681
[45] Date of Patent: May 31, 1988

[54] INTEGRATED-SERVICES RADIO TRANSMISSION SYSTEM

[75] Inventor: Werner Schmidt, Lauf-Oedenberg, Fed. Rep. of Germany

[73] Assignee: U.S. Philips Corporation, New York, N.Y.

[21] Appl. No.: 856,916

[22] Filed: Apr. 28, 1986

[30] Foreign Application Priority Data

May 4, 1985 [DE] Fed. Rep. of Germany ....... 3516074

[51] Int. Cl.$^4$ ................................................. H04Q 7/00
[52] U.S. Cl. ........................................ 455/33; 455/56; 370/95
[58] Field of Search ...................... 370/95, 94; 455/33, 455/56; 379/59, 60; 340/825.51, 825.52

[56] References Cited

U.S. PATENT DOCUMENTS 3,764,915 10/1973 Cox et al. ............................... 455/33

Primary Examiner—Douglas W. Olms
Assistant Examiner—James E. Busch
Attorney, Agent, or Firm—Thomas A. Briody; Algy Tamoshunas; William J. Streeter

[57] ABSTRACT

In a two-way radio transmission system, a fixed base station transmits and receives over at least one communication channel a plurality of messages for different types of receivers (TGAx) used in different services (DY). The base station transmits an organization data flow identifying the message type (TGAx) and services (DY). A plurality of different subscriber transmitter receiver sets receive each message type (TGAx) and transmits messages to the base station. The receiver sets decode the organizational data flow, and process only those messages and services which are associated with a given message and service type. In this way, different classes of communication services may be offered, using a common base station.

7 Claims, 3 Drawing Sheets

| SERVICES | TGA 1 | TGA 2 | TGA 3 |
|---|---|---|---|
| DA | X | | X |
| DB | | X | |
| DC | | | X |

| OM | TGA x | Dy | Kz | |
|---|---|---|---|---|

ORGANIZATIONAL MESSAGE

INTEGRATED-SERVICES RADIO TRANSMISSION SYSTEM

The invention relates to a radio transmission system.

The designation "integrated-services digital network" (ISDN) refers to a network which makes digital connections available for a plurality of services between standard, normalized user/network interfaces (Technische Mitteilungen PTT, 1/1985, "ISDN-Dienstintegrierte Digital-Netze" by H. K. Pfyffer, pages 2–8). In the journal article a survey of the essential characteristics of ISDN is given and possible future developments are indicated.

According to it, ISDN is characterized by the fact that the transmission of voice and non-voice signals (e.g. data signals) occurs in the same network and that a limited type range of normalized user/interfaces is provided for. In the integrated-services digital network ISDN standard access by subscribers to a plurality of services has to be provided, by means of a unified standard interface being provided at the subscriber's end throughout the network.

The interface which is standard to the network comprises so-called B channels and one D channel which are transmitted in digital multiplex, a B channel having a bit rate of 64 kbits/s and the D channel a bit rate of 16 kbits/s. At the interface the two B channels are independent of each other, so that two separate connections can be set up simultaneously with the interface circuit. The D channel is used on the one hand for signalling and on the other hand also for the transmission of messages with low bit rates (data transmission such as telemetry). The information transmission of the individual services, e.g. telephony, facsimile, high-speed data transmission, etc. is effected in the B channel with 64 kbits/s.

The OSI architecture model for the protocols is described in greater detail and explained on page 5 of the journal article referred to above. The integrated-services digital network ISDN then comprises layers 1 to 3 and, in accordance with the requirement of a unified standard network interface to be able to handle various services, the interface circuit in the first (lowest) layer must also be standardized. This means that the first layer has to be laid out for the service with the highest transmission demands (e.g. bit rate) and is therefore not economical frequency-wise when used in a radio transmission system.

A method for the setting-up of connections between subscriber stations with different terminal equipment, i.e. with differing needs for transmission channel capacities, is known from DE-OS No. 33 11 043. To establish the connection a calling subscriber station sends out, together with selection information, an information signal with which the required transmission channel capacity and, if necessary, the terminal equipment of the called subscriber station which has to be involved in the connection are indicated. The transmission channel capacities which are required for the particular connections are provided for by the switching station. Additionally, the switching station, using the information signal and particulars stored there concerning the calling subscriber station, tests whether the desired connection can be set up or not. If the connection can be set up, the required transmission-channel capacity is made available to the called and calling subscriber stations and, if necessary, the called subscriber station is informed what terminal equipment has to be brought into the connection.

When applied in an integrated-services radio transmission system a process of this kind with standard initial signalling has the disadvantage that it demands different transmission/reception devices for signalling and for the actual service.

In known similar radio transmission systems (cf., for example, TE KA DE Technische Mitteilung 1980, pages 10–14) the subscriber sets (mobile radio stations) are standard products as regards their function. The bodies operating radio transmission systems lay down system constants, such as, for example, the number of radio messages to be transmitted, audible signals, indications, HF and jitter thresholds, number of repetitions or guard times, in what are known as equipment specifications. The manufacturers of the subscriber sets incorporate the prescribed system constants somewhere in the particular programme developed, so that any change in the system constants requires a change of the programmes stored in the programme memory.

It has been recorded in P No. 34 31 302 how the body operating the radio transmission system can alter the system constants during operation without the manufacturer of the subscriber set having to alter the programme stored in the programme memory. To that end system constants and performance criteria are stored in a memory incorporated in the subscriber set, so that the possibility is created to restrict certain services to certain areas of the radio transmission system.

The problem to be solved by the invention is how to integrate various services with differing transmission requirements in a radio transmission system in such a way that little expenditure on the subscriber set is necessary and that, as well, the total bandwidth of the individual radio transmission channels provided for message transmission can be kept as small as possible.

This problem is solved by a radio transmission system according to the invention.

SUMMARY OF THE INVENTION

In the integrated-services radio tranmission system according to the invention, and in contrast to the subscriber sets in the ISDN, the maximum transmission rate is not made available to every possible user. The reasons for this are: (1) the limited system bandwidth available; (2) the fact that not all services are used at the same time by a participant; (3) the fact that not all possible services have to be implemented in every subscriber set; (4) the fact that only a few services have to be made available throughout the integrated-services radio transmission system. The total available bandwidth is divided between the subscriber sets with regard to time and area (geographical reuse of frequency), in accordance with the particular need at any given time.

With the integrated-services radio transmission according to the invention the cost can be reduced in a simple manner even in the fixed radio station if not every channel installation operates each of the many services. Thus the stationary radio stations are only provided with such equipment for various services for which a need exists on the part of subscribers.

In the integrated-services radio transmission system according to the invention not every possible function is implemented in every subscriber set since every user in any case makes use only of a few functions or services (different user groups).

The costs of the integrated-services radio transmission system consist essentially of the functions which are essential at least for access to the integrated-services radio transmission system and the functions for which a need exists on the part of the subscribers. The integrated-services radio transmission system according to the invention possesses the advantage for the manufacturers of the subscriber sets that it is now possible for the first time to create different product lines for the various market segments and to offer every subscriber a low-cost set which is tailored to his needs. These various subscriber sets may, for example, be: a simple paging receiver with alphanumeric indication; a "vest-pocket telephone" with one receiving and one transmitting frequency for use in a restricted geographical area and with a reduced service quality; a "dispatch set" (in the "dispatch service" a common channel is used in the direction from the fixed radio station to the vehicles of a fleet, while in the reverse direction each vehicle can use its own radio transmission channel) with one receiving and a few transmitting frequencies for semi-duplex operation; a portable telephone with several receiving and tramsitting frequencies for duplex operation and nation-wide coverage, which can also be used in the vehicle; a mobile data terminal with semi-duplex transmission in packet traffic with a low data rate; a "mobile office" (e.g. for building sites, banks, etc.) with transparent duplex transmission of 64 kbits/s, which is only operated from a fixed site.

The integrated-services radio transmission system according to the invention thus provides a frequency-economical solution for service integration with low costs for the particular subscriber set, with flexible and frequency-compatible introduction of future services and with the possibility of introducing low-rate speech-digitalization processes. Even if the services and the service spectrum cannot be provided for some time, or not in all countries, by the wired public telecommunication systems, the integrated-services radio transmission system according to the invention already creates the basis on which it will be possible to integrate these services in the future if these are offered by the wired transmission and switching system or made possible by technological progress (very large scale integration).

Furthermore, the integrated-services radio transmission system according to the invention also permits the introduction of new services with various bit rates and requirements, e.g. as regards error control, without affecting already existing services or subscriber sets which are in operation. In the direction from the subscriber set to the fixed radio station a receiver whose frequency is switchable over the entire available frequency band can be provided for every message-transmission channel. It is thus possible, with a single receiver-and-channel unit specified for a new service and its transfer into the metallic public network and installed in the fixed radio station, to offer this new service. The already existing receivers in the fixed radio station need be neither replaced nor modified. The additional receiver may be designed for a different modulation/-demodulation process, a channel coding appropriate to the service and also a different bandwidth. It is thus possible to implement any combination of different services at low cost. The receiver-and-channel units shown need only be installed in fixed stations where they will in fact be used. This means that locally, regionally or nationally different services can be offered.

The radio transmission system of one embodiment has the advantage that the only switching element common to all subscriber sets is a similar receiver for the transmission process from the fixed radio station to the subscriber sets. This switching section can be provided at low cost by means of a highly integrated circuit. For simple subscriber sets which are only used locally (e.g. co-called "message pagers") it is not even necessary for there to be a synthesizer. If a synthesizer is built into the subscriber set, it can also be operated throughout the network. "Pocket telephones" (with a fixed-frequency receiver and a fixed-frequency transmitter) can also be used if every receiver in the fixed radio station is switchable to all frequencies. The associated increased probability of blocking if this frequency is engaged can be reduced if a limited number of, for example, 40 transmitting frequencies can be selected in the subscriber set.

The radio transmission system of one embodiment has the advantage that the application of the multi-access process whereby subscriber sets have access to the radio transmission channels located in the entire frequency band ensures highly economical utilization of frequencies and quick access of subscriber sets to the network, especially in cases of traffic overload.

This embodiment includes a means for marking transmission channels. As is known in radio transmission systems with numerous transmission channels, it is necessary to separate the transmission channels from each other. In this context, radio transmission channels are duplex channels separated by different frequencies or different time slots, depending on whether frequency division or time division multiplex techniques are used. In this way, a special frequency or special time slot is marked.

The invention will now be described in greater detail and explained with reference to the forms of embodiment shown in the diagrams.

DESCRIPTION OF THE PREFERRED EMBODIMENT

Figures 1, 2, 3:
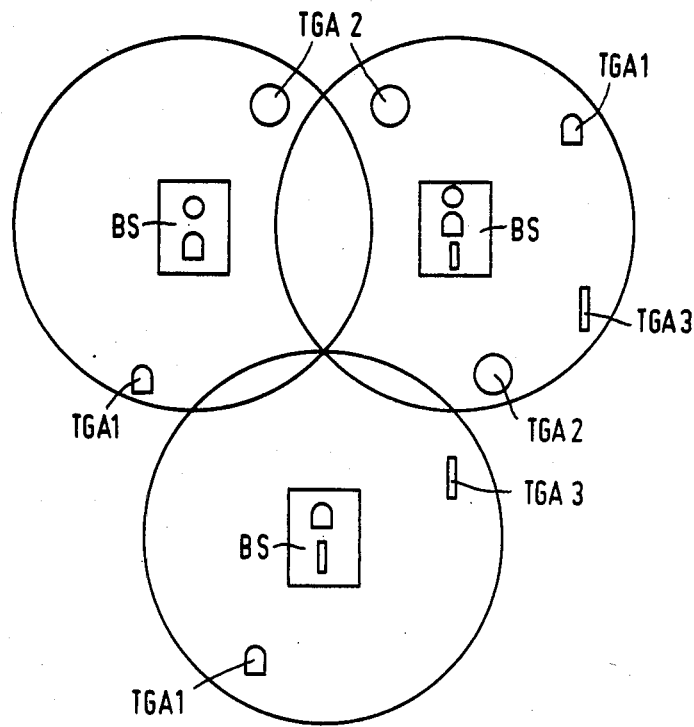
FIG. 1 the structure of the integrated-services radio transmission system according to the invention, FIG. 2 in tabular form, the allocation of various services to various susbscriber sets, FIG. 3 various messages transmitted on a radio transmission channel, FIG. 4 the block diagram of the transmitting section in the fixed radio station, and FIG. 5 the block diagram of the receiving section in the subscriber set.

FIG. 1 shows the structure of the integrated-services radio transmission system according to the invention. In the radio transmission system there are fixed radio stations BS arranged geographically in accordance with a cellular system. Each fixed radio station BS is allocated a number of radio transmission channels buy which messages are transmitted to mobile subscriber sets TG. One of these radio transmission channels is used for signalling for control of the system functions. This includes, for example, the transmission of dialling information in the establishment of calls to the subscriber sets TG. Various sorts of subscriber sets and various services can be operated in the radio transmission system.

In FIG. 1 the various kinds of subscriber sets are characterized by the reference numbers TGA 1, TGA 2, . . . Every subscriber set TG incorporates devices for the reception and evaluation of an organizational data flow conveyed by the radio transmission channel, which flow messages sent out by the fixed radio station (see FIG. 5). The various symbols indicate the service operable by the particular channel device. In the messages in the organizational data flow the subscriber sets TG are informed by the fixed radio station BS of the operable kinds of subscriber sets TGAx and/or the services by offered by the station.

The table in FIG. 2 shows the allocation of the various services to the various subscriber sets TG. As can be seen from the table, not all possible services Dy are implemented in every subscriber set TG. Service DA can, for example, be a voice service, service DB a data service with a low bit rate and service DC a data service with a high bit rate.

FIG. 3 shows various messages transmitted on the radio transmission channel. In the organizational data flow the subscriber sets TG are informed by the fixed radio stations BS, by means of the message Kz, of the radio transmission channels, e.g. $K_5$, $K_{17}$ and $K_{31}$, on which the fixed radio station BS is prepared for reception at that moment. Moreover, the subscriber sets TG are informed of a service Dy and/or a type of subscriber set TGAx in addition to the transmission channels Kz which can be received by the fixed radio BS. To characterize the aforesaid messages as organizational messages, a word designated as OM is placed at the beginning of the data block. The generation of the organizational data flow in the fixed radio station BS and the evaluation of the organizational data flow received in the subscriber set TG will now be described in greater detail and explained with reference to FIG. 4 and FIG. 5.

Figure 4:
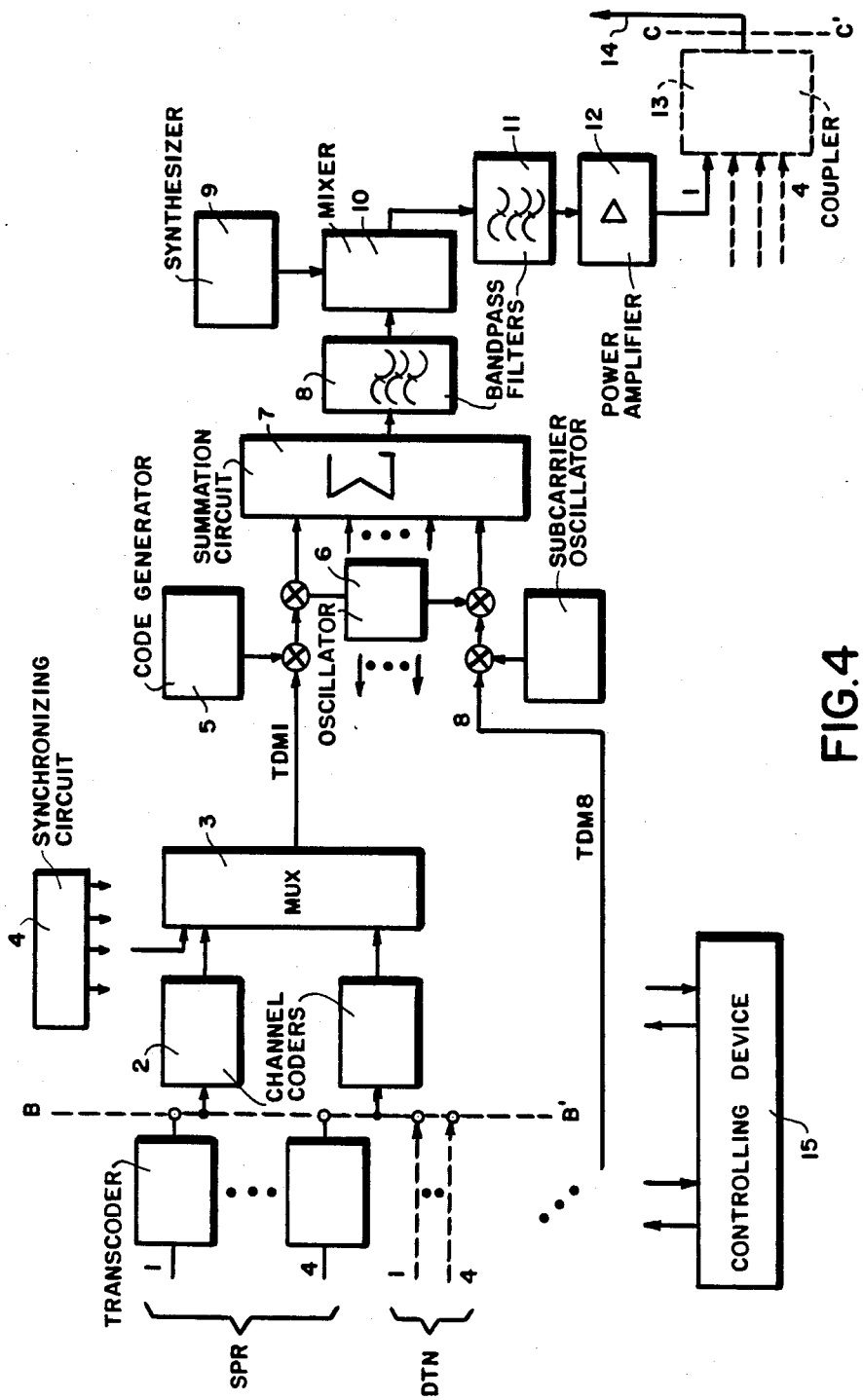

FIG. 4 shows the block diagram of the transmitting section of the fixed radio station BS for a fully built-out network. The data/speech flow transmitted in the baseband is made up as follows. The digitalized speech of each individual channel is first recoded in a transcoder 1 from PCM to the transmission form, with a correspondingly lower bit rate, required for radio transmission. A data source can be connected at the interface B—B. In a channel coder 2 connected to the data source or transcoder 1 a special coding for the protection of significant bits against transmission errors on the transmission channel is added. This channel coding differs according to the service to be transmitted. In a multiplexer 3 connected to channel coder 2 the signalling accompanying the connection and the synchronization information derived from a synchronizing circuit 4 are added to the data flow. The TDM signal (Time Division Multiplex signal) at the output of the multiplexer 3 thus contains, in the form of embodiment shown in FIG. 4, four speech/data channels, a connection-accompanying signalling channel (for a TDM channel bundle) and also the synchronization bits required for synchronization in the subscriber sets TG. The synchronization bits are mixed in code planes or frequency planes, as proposed in P No. 35 11 430 4.

The TDM signal at the output of multiplexer 3 is multiplied by the code words generated by code generator 5 at any particular time, in which process two bits are combined to form a symbol and this symbol is spread with the desired code. The resulting spread signal is then used to shift the phase of the carrier signal derived from an oscillator 6, so that a BPSK (Binary Phase Shift Keying) signal, a combination of the information and the code word being used to modulate a low carrier frequency, is obtained. The modulated code division multiplex CDM signal is taken to a summator, whose output is connected to a bandpass filter 8. Eight of these modulated CDM signals form after addition and bandpass filtering a joint signal with several steps of amplitude which is finally converted to the finally transmitted carrier frequency.

To that end a mixing oscillator in the form of a synthesizer 9 is provided which can be switched with corresponding steps within the frequency range of the integrated-services radio transmission system. The synthesizer 9 is designed only for the few possible frequencies of the FDMA (Frequency Division Multiplex Access) stage. The mixing of the CDM signal with the corresponding frequency delivered by the synthesizer 9 is performed in a device 10 which is connected to bandpass filter 11. The output of the bandpass filter 11 is connected to a power amplifier and the filtered and amplified transmission signal reaches aerial 14 through a transmitter coupler. In smaller fixed radio stations BS with up to 32 message transmission channels the transmitter coupler 13 is omitted completely.

The channel and code generator setting, the correct choice of the channel coding and the insertions of messages Kz, TGA and Dy into the organizational data flow are performed by means of a controlling device 15 incorporated in the fixed radio station BS. The selected radio transmission channel can then be a TDM channel in a CDM plane (cf. P 35 11 530.4).

Figure 5:
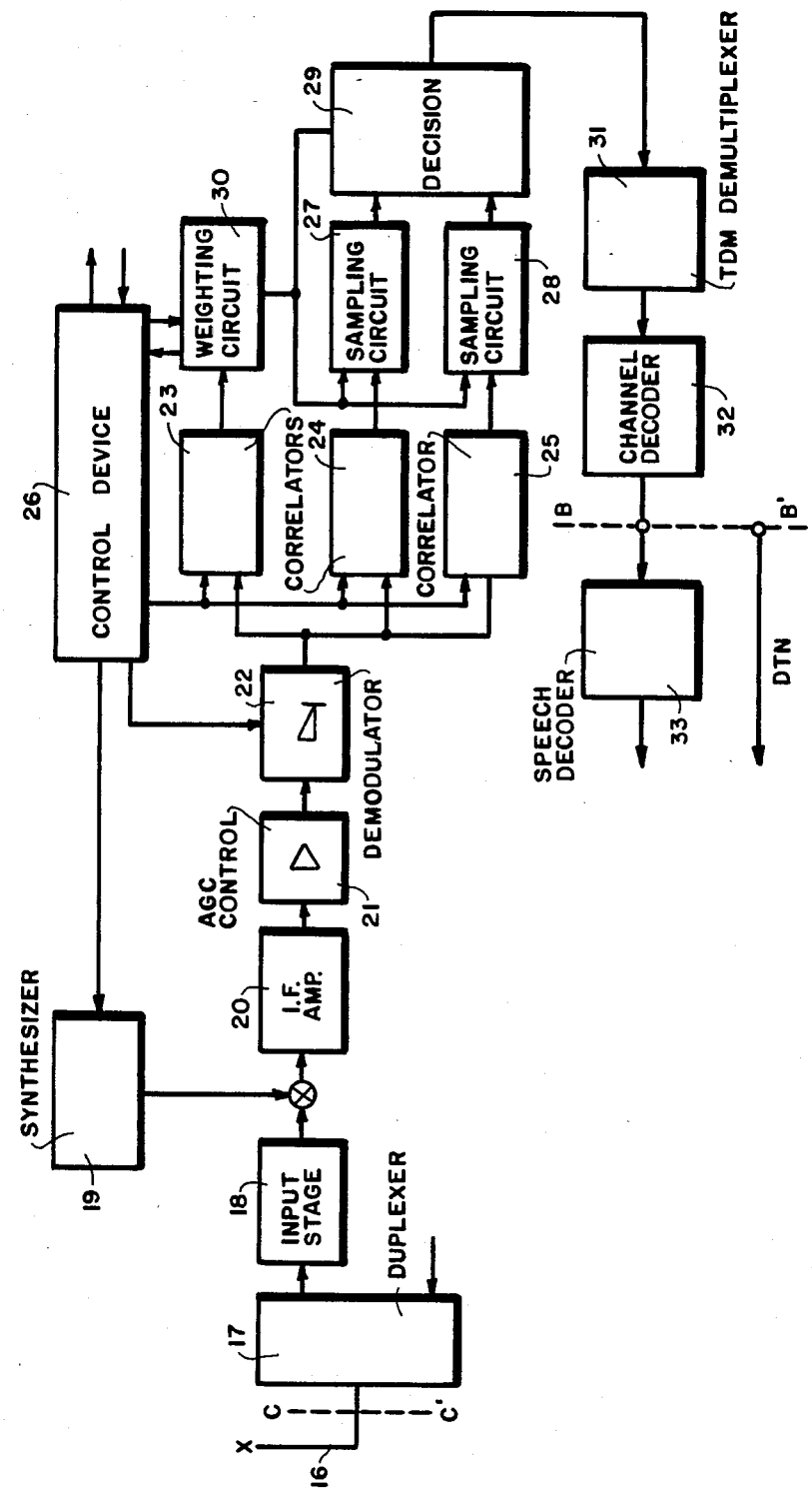

FIG. 5 shows the block diagram of the receiving section of subscriber sets TG. The signal received from a common transmitting/receiving aerial 16 arrives through a receiving filter of a duplexer 17 at the input stage 18 of the receiver. The requirements to be met by the receiving filter of duplexer 17 are relatively unexacting, so that a low-cost solution is obtained especially for subscriber sets TG with a low demand for services, e.g. a simple data radio set. The signal is amplified in the input stage 18 and then mixed with a synthesizer frequency derived from a synthesizer 19 to produce an intermediate frequency.

The intermediate frequency signal is taken to an IF section 20 in which further amplification and filtering of the signals are performed. A simple synthesizer which can be produced cheaply can also be used for the synthesizer 19, as is the case for synthesizer 9, in the fixed radio station BS. In the IF section 20 filters are arranged which perform the adjacent-channel selection for rejection of neighbouring wideband channels or for the suppression of mixing products. The actual noise filtering takes place in correlators 23 to 25. Connected to the IF section 20 is an amplitude control circuit 21 which raises the output signal from the IF section 20 to a level sufficient to match up with the subsequent circuits and to prevent a possible overloading of these circuits. The amplitude control circuit 21 evens out different radio propagation attenuations and level fluctuations caused by shadow effects. The control time constant of the amplitude-control circuit 21 is basically determined by these shadow effects.

The power-regulated IF signal at the output of the amplitude control circuit 21 is transposed to the baseband in a demodulator 22 connected with circuit 21. This can be effected, for example, on the principle of a Costas loop, so that frequency and phase can also be taken into account. Ambiguities about whole-number multiples of 180° can be recognized with the aid of the polarity of the synchronization words received (cf. P No. 35 11 430.4) and correspondingly corrected.

Connected to demodulator 22 are three correlators 23, 24 and 25 which are set by a control device 26 to the particular valid codes 1 and 2 and to a synchronization code which is valid for the entire channel bundle in the radio zone. By means of the control device 26 the received organizational data flow is evaluated by reading out the data relating to the service(s) desired by the subscriber and the radio transmission channels provided for the type of subscriber set TGAx, by selecting a radio transmission channel which has been indicated as free in the orgianizational data flow and is also switchable in the subscriber set TG and then sending an access signal to the fixed radio station BS on this selected radio transmission channel.

The output signal from correlators 23 to 25 is used on the one hand to derive the symbol clock, the frame clock and also the bit clock and, on the other, to evaluate the multi-path profile applicable at the moment. Since a standard synchronization code with a correspondingly larger level in the total channel bundle is radiated at the same moment (cf. P No. 35 11 430.4), a reliable recognition of synchronization and evaluation of the multi-path profile result.

The outputs of correlators 23 to 25 are connected to sampling circuits 27 and 28 which sample the output signals from correlators 23 to 25 and apply the particular result to a decision stage 29. In this process the results of the samples occurring synchronously with the echoes of the multi-path propagation in the decision stage 27 are weighted proportionally to the amplitude of the echoes (by means of a device 30). The decision stage 29 has the task of assessing the transmitted code and the polarity of the code. The assessment consequently permits the selection of the symbol transmitted with the greatest probability. After the symbolto transformation in the decision stage 29, the output signal is taken to a TDM demultiplexer 31 connected to decision stage 29. The demultiplexer 31 is connected to a channel decoder 32 at whose output the transmitted data flow is again available. In the case of digital speech transmission the digital speech signal is decoded in a speech decoder 33, and taken to a D/A converter and to a loudspeaker connected to the latter.

If, for example, data service is the type of service implemented in the subscriber set TG, the data occurring at the output of the channel decoder 32 can be immediately, for example, displayed or printed out.

What is claimed is:

1. A two-way radio transmission system comprising:
    at least one fixed base radio station (BS) for transmitting and receiving over at least one communication channel, said base radio station (BS) transmitting a plurality of messages for different types of receivers (TGAx) used in different services (DY), said base station transmitting an organizational data flow identifying said message type (TGAx) and services (DY); and
    a plurality of different subscriber transmitter receiver sets (TG) dedicated to receive each message type (TGAx) and for transmitting messages to said base station, said receiver sets including a decoder for evaluating said organizational data flow, each subscriber receiver set including circuitry for processing only those messages (TGAx) and services (DY) which are associated with a given message and service type, whereby a plurality of different classes of communication services may be offered using a common base station and said organizational data flow.

2. A radio transmission system as claimed in claim 1, in which the organizational data flow specifies those radio transmission channels (Kz) which the fixed radio base station (BS) is enabled for reception at the particular time.

3. A radio transmission system as claimed in claim 1, in which the messages in the organizational data flow are brought together and marked by means of an organizational message (OM), a service (Dy) and/or a subscriber set type (TGAx) and the radio transmission channels (Kz) which the fixed base station is enabled to receive at the moment being stated in each organizational message (OM).

4. A radio transmission system as claimed in claim 1, wherein each subscriber transmitter receiver set includes:
    a control device for evaluating said organizational data flow and identifying a channel which is free for transmission by said subscriber receiver set; and
    means for transmitting an access signal over said identified channel to said base radio station.

5. A radio transmission system as claimed in claim 2, in which every organizational message (OM) contains only such radio transmission channels (Kx) as are not seized at the moment by other subscriber sets (TG).

6. A radio transmission system as claimed in claim 1, wherein another message-transmission channel is available for one or more services, which the subscriber sets (TG) have access independently of each other through means of marking.

7. A radio transmission system as claimed in claim 4 or 6, wherein after a successful access by a subscriber set (TG), the subsequent message transmission is continued on another radio transmission channel allocated to the subscriber set by the fixed radio station (BS).

* * * * *